Dec. 29, 1964    F. F. PINTZ    3,163,174
CHEMICAL ADDING DEVICES FOR WATER SYSTEMS
Filed March 31, 1961    6 Sheets-Sheet 1

INVENTOR.
FREDERICK F. PINTZ
BY Cyrus D. Samuelson
ATTORNEY

INVENTOR.
FREDERICK F. PINTZ
BY Cyrus D. Samuelson
ATTORNEY

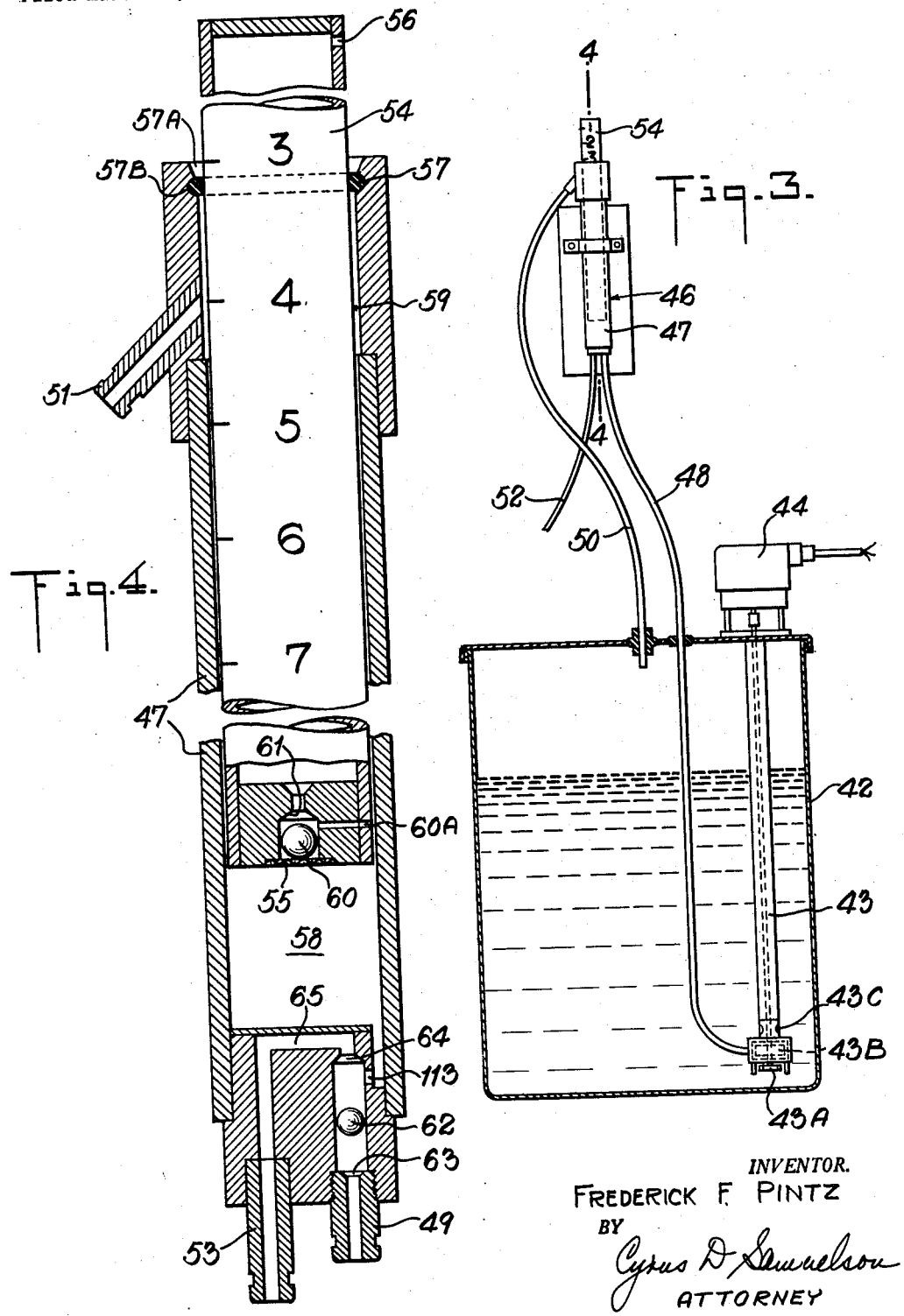

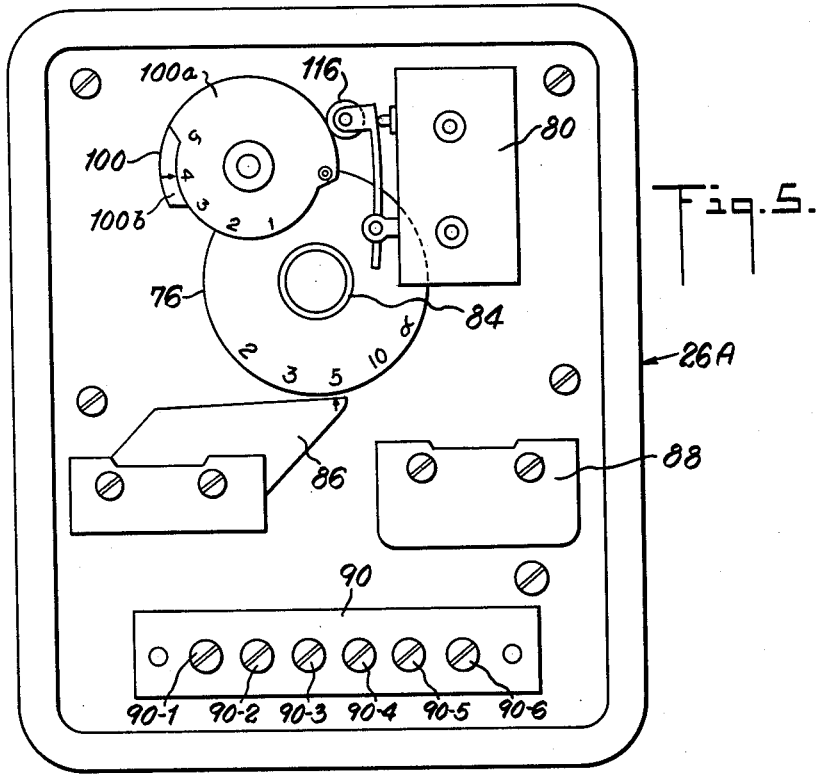
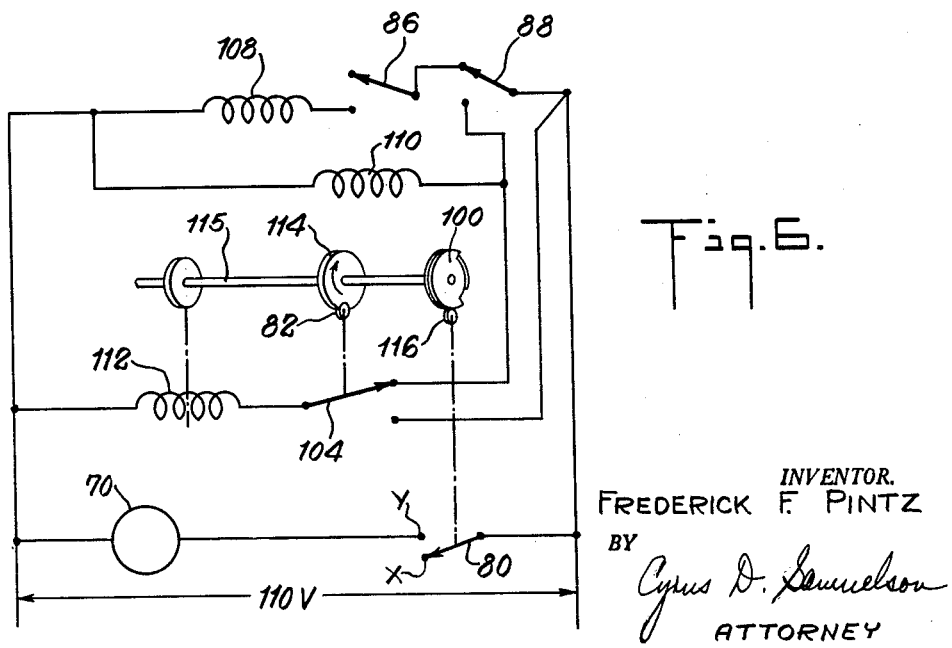

Dec. 29, 1964  F. F. PINTZ  3,163,174
CHEMICAL ADDING DEVICES FOR WATER SYSTEMS
Filed March 31, 1961  6 Sheets-Sheet 5
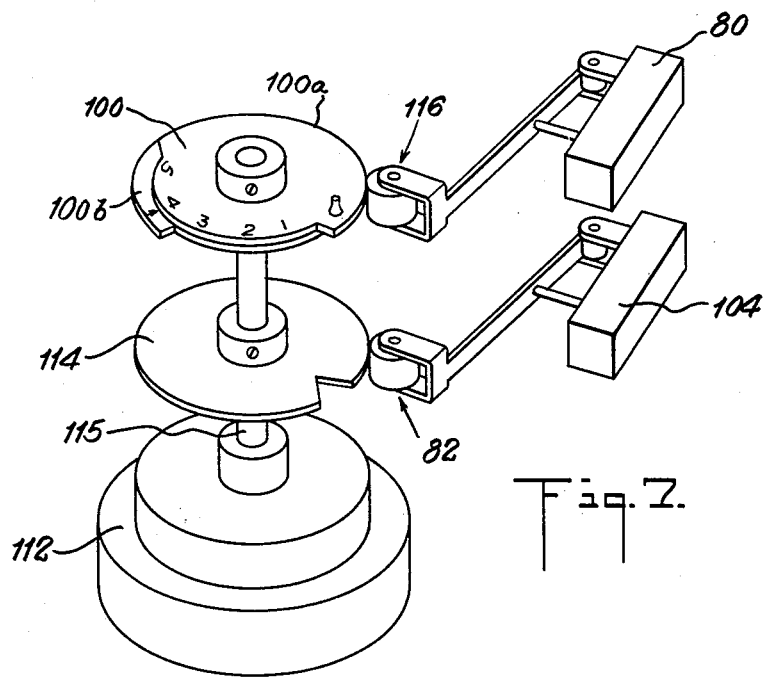
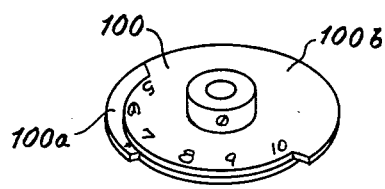
INVENTOR.
FREDERICK F. PINTZ
BY
Cyrus D. Samuelson
ATTORNEY

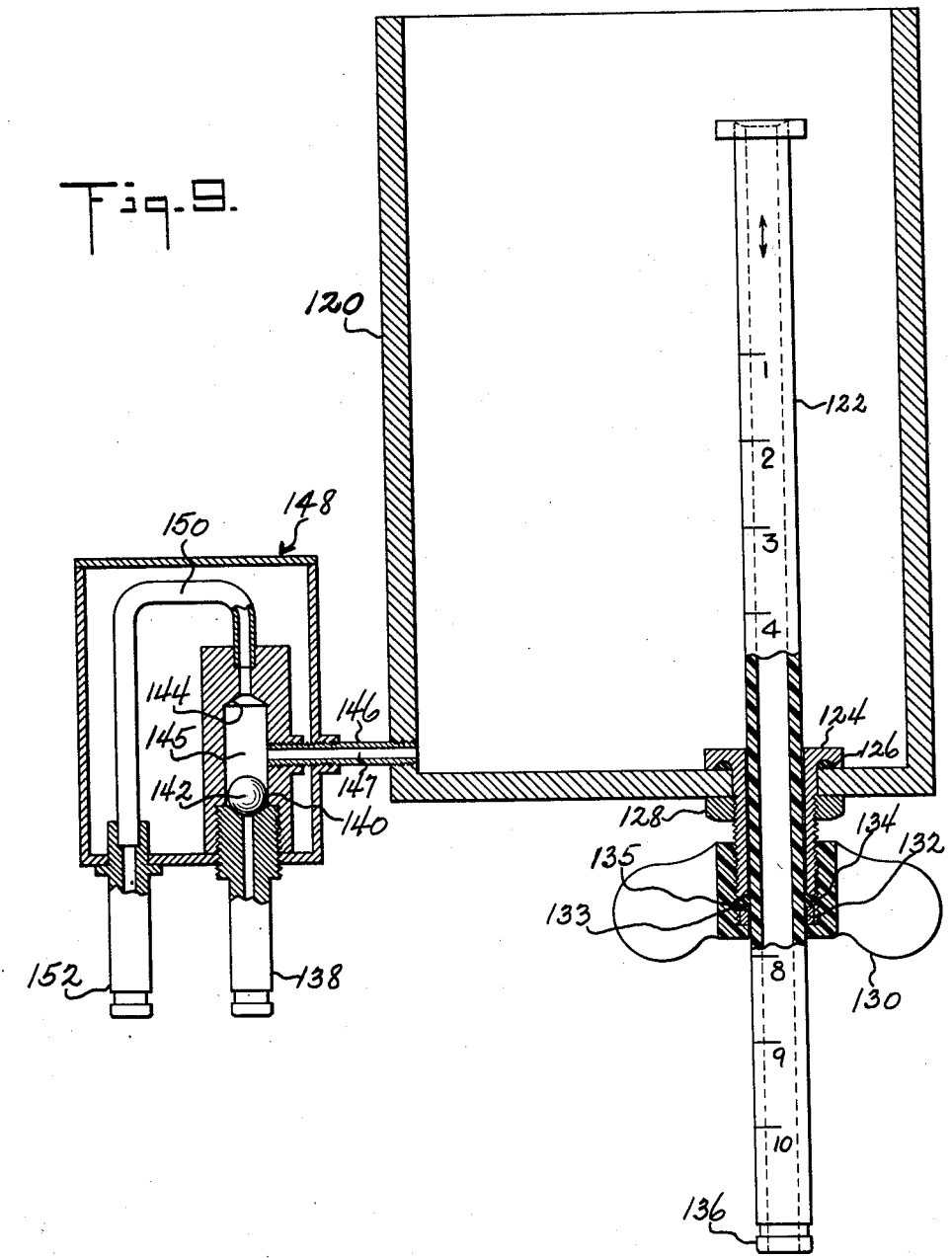

United States Patent Office 3,163,174
Patented Dec. 29, 1964

3,163,174
CHEMICAL ADDING DEVICES FOR
WATER SYSTEMS
Frederick F. Pintz, Leonia, N.J., assignor to Heller Laboratories, Inc., Leonia, N.J., a corporation of New Jersey
Filed Mar. 31, 1961, Ser. No. 99,766
1 Claim. (Cl. 137—101.27)

My invention relates to chemical adding devices for recirculating water systems and in particular to devices for adding measured amounts of treatment chemicals, which are in proportion to the amounts of water consumed, to recirculating cooling water systems which are used for air conditioning, refrigeration, humidification, industrial process cooling and similar uses.

In the prior art systems it has been difficult to add a predetermined desired amount of treatment chemicals to water systems automatically and simply. In particular, it has been difficult to always add the desired amount of treatment chemicals in proportion to the amount of water evaporated or otherwise consumed. In my earlier filed application Serial No. 591,699, filed June 15, 1956, for Water Treatment Device, now Patent 2,986,154, I described a device for maintaining the mineral concentration in recirculating water system at a fixed predetermined level. The system was also designed to control the addition of chemicals in solution to the water system during the make-up cycle. The chemical adding tank described in this earlier application was mounted on the cooling tower and was actuated by the controller and make-up flow. Moreover, the requirements of some installations were more demanding than others and these tanks were not sufficiently positive and exact for such installations. The present invention is directed toward providing a device for adding measured amounts of chemicals to any recirculating cooling water system which are in fixed proportion to the load on the system or the amount of water evaporated or otherwise consumed.

Chemical adding devices of my invention may be used to add amounts of treatment chemicals, which are in proportion to the amount of water consumed, into water systems of the following description:

(1) Recirculating cooling water systems with chemical feed directly into an open tower, sump or spray pond at atmospheric pressure.

(2) Recirculating cooling water systems with chemical feed to closed towers or sumps at atmospheric pressure.

(3) Recirculating cooling water systems with chemical feed directly to recirculating systems at any point under pressure or at atmospheric pressure.

It is an important object of my invention to provide a chemical adding device for water systems which will discharge into the system amounts of treatment chemicals, which are in proportion to the amounts of water consumed, on demand.

It is a further object of my invention to provide such a chemical adding device which may be actuated at the start of either the evaporation, bleed-off or make-up cycles.

It is a still further object of my invention to provide such a chemical adding device which may be mounted on or adjacent to the cooling tower.

It is a still further object of my invention to provide an inexpensive, combined chemical pump and agitator which is employed to feed treatment chemicals at atmospheric pressure to a cooling tower, sump tank or similar unit and which is mounted on a cover to fit the plastic tank which may be nested inside a standard 55 gallon steel drum.

It is a still further object of my invention to provide such a device which may be mounted or installed at a point which is distantly removed from the cooling tower.

These and other objects, features, uses and advantages will be apparent during the course of the following description when taken in conjunction with the accompanying drawings wherein:

FIGURE 3 is an elevational view of the chemical storage tank and measuring unit used in conjunction with the system of FIGURE 1;

FIGURE 4 is an enlarged sectional view taken along the lines 4—4 of FIGURE 3;

FIGURE 5 is a front elevational view of the combined controller and timer used in conjunction with the system of FIGURE 2;

FIGURE 6 is a schematic diagram of the electrical system of the timer and controller of FIGURE 5;

FIGURE 7 is an exploded view of the timer of FIGURE 5 wherein the chemicals may be added for from 0 to 5 minutes;

FIGURE 8 is a view of the timing disk of FIGURE 7 wherein the chemicals may be added for from 5 to 10 minutes; and FIGURE 9 is a view, partly in section and partly in elevation, of a further embodiment of chemical adding device and measuring unit of my invention.

Figure 1:
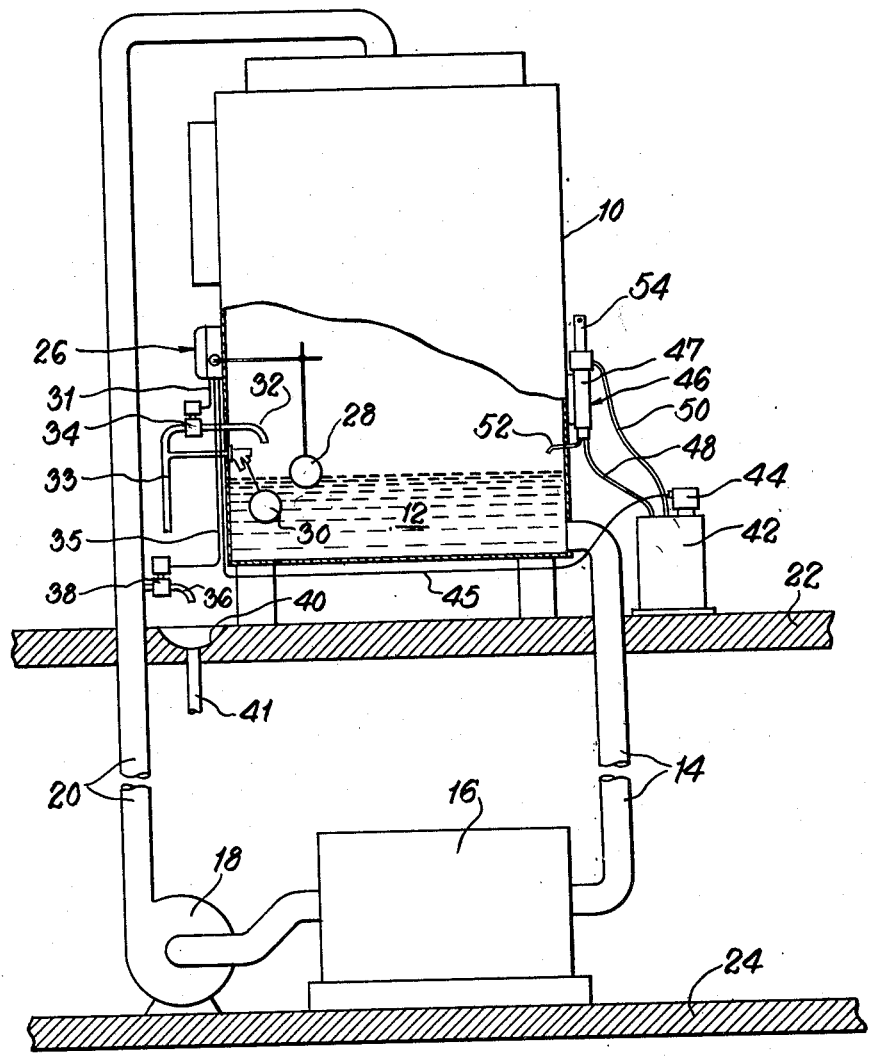
FIGURE 1 is an elevational view of a recirculating cooling water system in which the chemical adding device is mounted on the cooling tower to feed chemicals into the open tower.

In the drawings, wherein, for the purpose of illustration, are shown preferred embodiments of chemical adding devices of my invention and wherein like numerals are employed to designate like parts throughout the same, the numeral 10 designates a water system cooling tower in which is contained cooling water 12. Tower 10 is mounted on roof 22 or in any location where it can be supplied with air for cooling and may be either an open or enclosed tower. Condenser 16 is mounted on basement floor 24 or in any other convenient location. Pump 18 pumps the liquid from condenser 16 back to tower 10 through pipe 20 and pipe 14 carries the liquid from tower 10 to the input of condenser 16. Under certain conditions such as in process cooling systems, condensers are not used but the devices of my invention may be used in such systems.

Condenser 16, lines 14 and 20, and all parts of the circulating system are filled to the level of water in the tower before starting circulation and the system is kept at that full level by float control 28.

Controller 26 such as has been described in my previously mentioned, copending patent application is affixed to the side of tower 10. Float 28 is connected to controller 26 and serves to actuate the bleed-off and make-up controls when the predetermined levels of the liquid 12 in tower 10 are obtained. Float 30 is the tower float, is optional and serves as a standby, safety, mechanical float valve. In the event the solenoid valve 34 fails, the water level in the tower will fall until the level is below the setting of float 30 at which point the mechanical float valve opens allowing water to enter tower 10. Inlet tube 32 is controlled by valve 34 (shown diagrammatically on FIGURES 1 and 2) and serves to supply make-up water from line 33 to tower 10. Outlet tube 36 is controlled by valve 38 (shown diagrammatically in FIGURES 1 and 2) and serves to bleed off water from pipe 20 into sump 40 and thence through drain pipe 41. Valves 34 and 38 are standard solenoid operated valves. Controller 26 controls the operation of solenoid valves 34 and 38 through electrical control lines 31 and 35 respectively.

Figure 2:
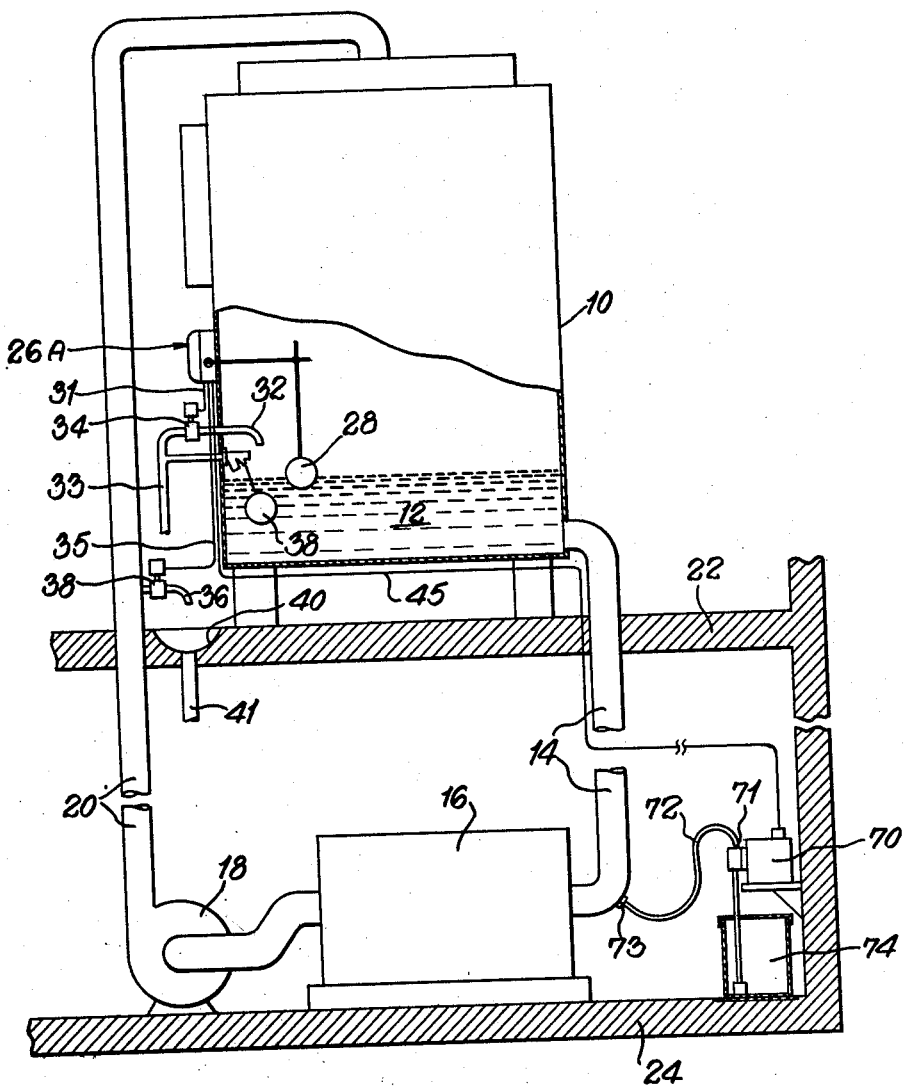
FIGURE 2 is a view similar to that of FIGURE 1 wherein the chemicals are added to the system under pressure at a point remote from the cooling tower.

Tank 42 contains the proper chemical solution which is necessary to treat the water system of FIGURE 1 and is mounted adjacent to tower 10. Measuring tube 46 is mounted on tower 10 and is used to deliver the proper amount of the chemical solution from tank 42 during each cycle. Tube 46 may be filled by pump 44 during the evaporation, bleed-off or make-up cycles and the treatment chemical may be discharged into tower 10 during bleed-off, make-up or after make-up has been completed. I have found it best to wire the system as shown in FIGURE 6 so as to discharge the contents of tube 46 into tower 10 immediately after the make-up cycle is completed.

Pump 44 is mounted on tank 42 so that it pumps the chemical solution from tank 42 into tube 46. The operation of pump 44 is controlled by controller 26 through electrical line 45 (FIGURE 1). Tube 48 is the inlet line to measuring tube 46, tube 50 is the overflow return line from measuring tube 46 to tank 42, and tube 52 is the feed line from measuring tube 46 to tower 10.

Measuring tube 46 (FIGURES 3 and 4) is seen to comprise outer cylindrical housing 47 and rod 54 with indicia thereon which fits inside housing 47. Inlet line 48 is connected to inlet fitting 49 at the bottom of housing 47. Feed line 52 is connected to outlet fitting 53 which is also located at the bottom of housing 47. Overflow return line 50 is connected to overflow fitting 51 which is located near the top of housing 47. When pump 44 is started, pump shaft 43 rotates thereby causing impeller 43B to force liquid up tube 48 into housing 47. The chemical solution is drawn into the pump from the tank through inlet holes 43C. Inlet holes 43C are preferably covered with a strainer or similar screen. Agitator 43A is also rotated by pump shaft 43 and serves to mix the chemicals in the solution in tank 42. In FIGURE 3, the motor and pump are mounted on a cover which fits on the plastic tank 42 which can be nested inside a standard 55 gallon drum or may be used without the standard drum as shown in the figure. The liquid from tank 42 is forced up tube 48 and its pressure forces ball 62 up against seat 64. This closes off channel 65 to any flow from tube 48. The solution then flows through orifice 113 into cavity 58 and then flows up between rod 54 and housing 47 into space 59 which is between rod 54 and housing 47. Seal 57 is provided between rod 54 and the top of housing 47 so that the solution cannot leak out at the top of measuring tube 46.

The pressure of the solution being pumped into cavity 58 causes ball 60 to be pushed up against seat 61 and thus seal the interior of rod 54 which is hollow against the entrance of any liquid into the hollow space. Screen 55 prevents ball 60 from falling when there is no liquid pressure.

When the inside of housing 47 has become filled with solution, the excess is pumped out through overflow fitting 51 and tube 50. Tube 50 is connected so that it delivers the solution which flows through it back to tank 42. When pump 44 is turned off, ball 62 falls down and seats itself against seat 63 so as to seal off inlet tube 48 from the inside of housing 47. Orifice 56 in rod 54 permits atmospheric pressure to be applied against ball 60. This causes ball 60 to drop away from seat 61 and the solution in measuring tube 46 is now under static pressure and starts to flow out through orifice 113, channel 65, fitting 53 and tubing 52 to mix with tower water 12. Orifice 60A is provided to permit air to escape when housing 47 is being emptied of solution. I have found this to be necessary when rod 54 is set on a low number and the solution, which remains at the bottom of cavity 58, traps the air and causes improper discharge of the solution from measuring tube 46.

The electrical contacts and wiring can be arranged so that pump 44 may be started at the beginning of any step in the operating cycle and may be shut off at the end of that step in the operating cycle. I have found it best to arrange the electrical contacts and wiring so as to start the pump during the make-up cycle and to turn it off at the end of the make-up cycle (causing ball 62 to drop, sealing off the measured amount of treatment solution from returning to the storage barrel, but allowing it to drain through channel 65 to tower water 12). The indicia marked on rod 54 are arbitrary but serve to calibrate the adding device so that a measured amount of solution is delivered to the tower. To set the rod in the housing, rod 54 is withdrawn from housing 47, ring 57 on rod 54 is rolled to a position in which it is ½″ below the desired setting. Then rod 54 is pushed into housing 47 so ring 57 is trapped between rod 54 and the tapered entry hole 57A in housing 47. Rod 54 is pushed down further until ring 57 rolls and snaps into recessed seat 57B and locks in place with the desired indicia mark at the top of housing 47.

In FIGURES 2, 5, 6 and 7 there is illustrated an alternate embodiment of chemical adding device of my invention which is used when treatment chemicals must be fed under pressure at any point in a system rather than feeding chemicals directly to the tower at atmospheric pressure as in FIGURE 1. Controller 26A is similar to controller 26 of FIGURE 1 and contains therein a timer whose function will become obvious as this description proceeds. Tank 74, containing chemicals in solution, is placed near condenser 16 or at any other convenient location. Pump 70 is a pressure pump capable of overcoming the static pressure to be encountered at the injection point and pumps the chemical solution from tank 74 into pipe 14 through line 72.

Dial 76 is marked with indicia to show the mineral concentration. It is moved by means of knob 84 so that the desired mineral concentration is opposite the arrow on the follower on switch 86. Switch 86 is moved to the proper position by dial 76 which bears on the follower on switch 86.

Check valves 71 and 73 are provided to prevent liquid from line 14 from being fed through line 72 to chemical tank 74. Any standard check valves capable of withstanding the head of pressure and chemical corrosion may be used.

Considering the electrical circuit of FIGURE 6: bleed-off switch 86 is actuated when the level of water 12 in tower 10 reaches the predetermined setting as sensed by float 28; when the switch 86 closes, voltage is applied through switches 86 and 88 to solenoid 108. Solenoid 108 operates the bleed-off valve 38. As water 12 is bled off from line 20 through valve 38 the level in tower 10 is lowered, the level of float 28 drops down until it causes make-up switch 88 to close to the lower contact in FIGURE 6. This opens the circuit to bleed-off solenoid 108 and closes the circuit through make-up solenoid 110. Make-up solenoid 110 opens make-up valve 34 and fresh water is introduced into tower 10 while at the same time, bleed-off stops because the circuit to solenoid 108 is opened.

At the same time that make-up switch 88 closes to the down position in FIGURE 6 to close the circuit through solenoid 110, it also closes the circuit through clock coil 112 causing the clock to rotate cam shaft 115 in the direction shown by the arrow of FIGURE 6. Shaft 115 rotates both the pump timer cam 100 and the clock lock-in cam 114. This rotation causes contact roller 82, in contact with lock-in cam 114 to be depressed, moving the contactor on snap switch 104 to the lower contact (FIGURE 6), thereby locking the clock coil 112 directly across the power line. So it can be seen that the cam shaft will have to make one full revolution each time the control circuit is activated.

The time for one revolution of the lock-in cam 114 is determined by the gearing in the clock motor (gearing not shown). While clocks with different values of elasped time for one revolution of the cam shaft could be chosen, following are the limitations on the time for one revolution of the cam shaft:

(1) The time for one revolution of the cam shaft must not be so short that there is insufficient time for make-up to be completed before one revolution of the timer cam shaft is completed. Under such a condition of faulty second recycling of the timer would take place.

(2) The time for one revolution of the cam shaft should not be so short that the pump can not pump the full maximum volume of treatment required, per cycle of operation. Under such a condition the chemical pumping capacitiy is limited.

(3) The time for one revolution of the cam shaft should not be so long that it is longer than the minimum period of time that can be expected for completion of a cycle of evaporation, bleed-off and make-up at full load conditions for the system. Under such a condition there will be only one feed of chemical treatment for two or more cycles of operation.

Chemical pumping rates, water use rates for towers, and flow rates of make-up water therefore govern the length of time to be chosen for one revolution of the cam timer shaft. I have made a survey of many different makes and designs of cooling towers and systems and have found a ten minute period for one revolution of the cam shaft is suitable for most systems.

As the cam shaft 115 is rotated by the clock, pump timer cam 100 is in contact with switch contact roller 116. Contact roller 116 is pushed out as the saddle of the cam engages the roller, moving switch 80 from contact X to contact Y (FIGURE 6). This causes pump motor 70 to pump solution for the period of time set on adjustable split cam 100.

In FIGURE 7 I have shown an exploded view of the timer mechanism. Timer cam 100 is an adjustable split cam and comprises cam disks 100a and 100b. As illustrated in FIGURE 7 the cam is set to permit pumping for 4 minutes. Switch 80 is wired so that the circuit to pump motor 70 is closed when contact roller 116 is riding in the saddle formed by the two disks. In FIGURE 8 split cam 100 has been turned over and is shown set for 7 minutes of pumping time. In this case pump motor 70 is wired to point X (FIGURE 6) so that the circuit to pump motor 70 is closed when contact roller 116 is riding on the outer rim of split cam 100 and the circuit is open when contact roller 116 is riding in the saddle of split cam 100.

The operation of the timer and cam mechanism is as follows:

(1) Circuit through timer coil 112 is closed through switches 88 and 104.

(2) Contatct roller 82 moves out of the notch on cam 114 and snaps switch 104 to the lower contact position in FIGURE 6. This locks timer coil 112 across the 110 volt line.

(3) As the shaft 115 rotates, split cam 100 rotates and contact roller 116 falls into the saddle formed by cams 100a and 100b.

(4) Switch 80 is wired to close the circuit to pump 70 when contact roller 116 is in the saddle (point Y) and the pump operates for the time the roller is in this position.

(5) Contact roller 116 raises up on the outer rim of split cam 100 and pumping stops.

(5A) If split cam 100 is mounted on shaft 115 as shown in FIGURE 8 and pump motor 70 is wired to point X on switch 80, the circuit is closed when contact roller 116 is on the rim of split cam 100 and the pump will not operate during the time contact roller 116 is in the saddle.

(6) When shaft 115 has made a complete rotation, contact roller 82 drops into the notch in cam 114 and the operation is complete, the pump is shut off and the mechanism is ready for the next cycle.

In FIGURE 5 I have shown a combined controller and timer 26A. It is also within the contemplation of my invention to provide a timer which is separate from the controller but I have found it advantageous to use a combined unit. Terminal board 90 is provided to make the field connection of the electrical circuits simple and easy for the equipment installer. In the particular embodiment illustrated in FIGURE 5, contacts 90–1 and 90–2 are connected to pump 70; contact 90–2 is also connected to one side of the power line and to one side of bleed-off solenoid 108. Contact 90–3 is connected to the other side of bleed-off solenoid 108. Contacts 90–4 and 90–5 are connected to make-up solenoid 110 and contact 90–6 is connected to the other side of the power line. The necessary internal connections to complete the circuit of FIGURE 6 are made to the various terminals of terminal board 90.

Pump 70 must be of a design to withstand attack from the chemicals to be pumped. Usually a diaphragm type of pump is most suitable but a piston pump of suitable design and materials can be used. Pump 44 is preferably a low pressure centrifugal or impeller type of pump with parts in contact with the treatment solution of materials that will not be attacked by it. The operation of controllers 26 (FIGURE 1) and 26A (FIGURE 2) is essentially the same as that which has been described in my previously referred to, copending application for Letters Patent.

The chemical adding device of FIGURE 9 is similar to that of FIGURES 1, 3 and 4 and is used with larger water systems. The device of FIGURE 9 is preferred over that of FIGURES 3 and 4 because the measuring rod can be kept small and easy to move even when a relatively large volume of chemical solution must be added to the water system. I prefer to fashion all of the components except ball 142 and O-rings 126 and 132 of noncorrosive material such as specially treated metal or plastic. Ball 142 is preferably formed of glass, though it may be of any other noncorrosive material, and O-rings 126 and 132 are preferably formed of rubber or similar noncorrosive resilient material.

The chemical adding device of FIGURE 9 is used in conjunction with a tank similar to that of tank 42 (FIGURE 1) and is mounted on or adjacent to the tower or other point in the system at which the chemical solution is to be added. It is seen to comprise receptacle 120, measuring rod 122 and orifice 147. Measuring rod 122 is hollow and is mounted to receptacle 120 by means of hollow bolt 124 and nuts 128 and 130. It may be slid in the directions indicated by the arrows in the figure. O-ring 126 is used to prevent leakage between the head of bolt 124 and receptacle 120. O-ring 134 serves two purposes: first, it holds measuring rod 122 in fixed position; and second, it prevents leakage between rod 122 and bolt 124.

Rod 122 is mounted to receptacle 120 as follows: bolt 124 and O-ring 126 are set in place against the bottom of receptacle 120; nut 128 is threaded onto bolt 124 so that the bolt is tightly fixed to receptacle 120; rod 122 is slid inside hollow bolt 124; O-ring 134 is slid on over the bottom of rod 122; follower 132 is placed on rod 122 under O-ring 134; and nut 130 is slid on rod 122 below follower 134 and its threads are loosely engaged on those of bolt 124.

To adjust the setting of rod 122 it is moved until the desired indicia marking is at the bottom of nut 130. Next, nut 130 is tightened so that O-ring 134 is deformed by chamfers 133 and 135 on follower 132 and nut 124. This deformation of the O-ring pushes it against rod 122 and thereby holds rod 122 firmly in place. To change the setting it is only necessary to loosen nut 130, move the rod to the new setting and tighten nut 130.

Valve and feed mechanism 148 is seen to comprise ball check valve 145, input fitting 138, output fitting 152 and channel 150. Ball check valve 145 is connected to receptacle 120 by means of fitting 146 which contains orifice 147. An input line (not shown) is connected between a chemical storage tank (not shown) and fitting 138. An overflow output line (not shown) is connected between fitting 136 and the chemical storage tank. An output feed line is connected between fitting 152 and the tower or other point at which the chemical solution is to be added to the system.

Fitting 146 is threaded into receptacle 120 and into ball check valve 145. When the pump (not shown) is pumping solution into receptacle 120, ball 142 is forced up against seat 144 by the solution being forced up through fitting 138. This closes off channel 150 and permits the solution to enter receptacle 120 through orifice 147. When the pumping ceases, ball 142 drops into seat 140 and the chemical solution flows from receptacle 120 through channel 150 and fitting 152 to the tower. The ball 142 prevents any chemical solution from flowing back into the storage tank through fitting 138.

The mechanism is adjusted so that the receptacle will be filled only a fraction of an inch beyond the required amount during the pumping cycle. The excess passes through the inside of rod 122 and fitting 136 and back to the chemical storage tank. When pumping stops, the slight excess flows out through rod 122 and the desired quantity flows out through channel 150 and fitting 152 to the tower. The size of orifice 147, the pumping capacity of the pump and the size of the opening in hollow tube 122 must be such that the level of fluid in receptacle 120 will never rise more than a fraction of an inch above the top of tube 122. It should be noted that the higher rod 122 projects inside receptacle 120, the greater will be the amount of chemical solution fed to the system. The indicia are marked on rod 122 and the device is calibrated so as to indicate the specified volumes delivered to the water system at each of the settings of the rod.

Operation proceeds as follows: pumping preferably starts at the beginning of the make-up cycle and continues through it; ball 142 is forced against seat 144, sealing off channel 150; chemical solution enters receptacle 120 through orifice 147 and when it reaches the top of rod 122, the excess flows back into the storage tank through rod 122 and fitting 136; at the end of the make-up cycle the pumping stops and ball 142 drops into seat 140; inlet fitting 138 is sealed off from receptacle 120; and the contents of receptacle 120 flow into the tower through channel 150 and fitting 152.

The amount of chemical solution added to a water system is proportional to the amount of water consumed by the system when chemical adding devices of my invention are used. This becomes evident when one considers that the operation of the chemical adding device is controlled by the float which is connected to the controller. Thus, the faster and more frequently the level of the water system drops the more frequently will chemical solution be added to the system. Similarly, if the level drops slowly and less frequently, the chemical adding device will operate less frequently.

While I have disclosed my invention in relation to specific examples and in specific embodiments, I do not wish to be limited thereto, for obvious modifications will occur to those skilled in the art without departing from the spirit and scope of my invention.

Having thus described my invention, I claim:

A chemical adding device for water systems comprising a tank, a chemical solution in the tank, a receptacle having a first opening and a second opening therein, valve and feed means having an input fitting, an output fitting and a ball valve, the valve and feed means being connected to the receptacle through the first opening therein, the output fitting being connected to the water system, pumping means connected between the tank and the input fitting, the second opening in the receptacle being in the bottom thereof, a hollow measuring rod inserted in the second opening in the receptacle and movable into and out of the receptacle, means for starting the pumping means when a first predetermined condition is reached in the water system such that the pressure operates the ball valve to open the passage between the tank and the receptacle to permit chemical solution from the tank to be pumped into the receptacle and at the same time the ball valve closes the passage between the receptacle and the output fitting, overflow means connected between the lower end of the hollow measuring rod and the tank such that all the chemical solution in the receptacle which rises above the top of the hollow measuring rod is returned to the tank through the hollow measuring rod and the overflow means, means for stopping the pumping means when a second predetermined condition is reached in the water system such that the ball valve closes the passage between the tank and the receptacle and opens the passage between the receptacle and the output fitting to deliver the chemical solution in the receptacle to the water system, the amount of chemical solution delivered to the water system being determined by the height of the hollow measuring rod within the receptacle and the frequency of the delivery of the chemical solution to the water system being determined by the frequency with which the predetermined amount of water is consumed in the water system so that the amount of chemical solution added to the water system is proportional to the amount of water consumed therein.

References Cited in the file of this patent
UNITED STATES PATENTS

| | | |
|---|---|---|
| 1,577,157 | Averill | Mar. 16, 1926 |
| 1,959,276 | Paardecamp | May 15, 1934 |
| 2,297,011 | Mooney | Sept. 29, 1942 |
| 2,351,580 | Beckman | June 20, 1944 |
| 2,557,386 | Lonier | June 19, 1951 |
| 2,657,835 | Gerken | Nov. 3, 1153 |
| 2,732,850 | Tewksbury | Jan. 31, 1956 |
| 2,758,716 | Oswald | Aug. 14, 1956 |
| 2,761,595 | Vergers | Sept. 4, 1956 |
| 2,857,964 | Vore | Oct. 28, 1958 |
| 2,895,652 | Rockriver | July 21, 1959 |
| 2,906,332 | Rosten | Sept. 29, 1959 |
| 2,943,770 | Schmid | July 5, 1960 |
| 2,968,310 | Letts | Jan. 17, 1961 |
| 3,047,004 | Sterrett | July 31, 1962 |